United States Patent
Rugg et al.

(10) Patent No.: US 9,901,874 B2
(45) Date of Patent: Feb. 27, 2018

(54) HIGH TEMPERATURE AIR SEPARATION SYSTEM ARCHITECTURE

(71) Applicant: Hamilton Sundstrand Corporation, Windsor Locks, CT (US)

(72) Inventors: Jared Rugg, West Hartford, CT (US); Catherine Thibaud, South Windsor, CT (US); Thomas M. Zywiak, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 63 days.

(21) Appl. No.: 14/600,393

(22) Filed: Jan. 20, 2015

(65) Prior Publication Data
US 2016/0206995 A1    Jul. 21, 2016

(51) Int. Cl.
*B01D 53/02* (2006.01)
*B01D 53/66* (2006.01)
*B01J 19/24* (2006.01)
*B64D 37/32* (2006.01)

(52) U.S. Cl.
CPC .............. *B01D 53/66* (2013.01); *B01J 19/24* (2013.01); *B64D 37/32* (2013.01); *B01J 2219/00164* (2013.01); *B01J 2219/24* (2013.01); *Y02T 50/44* (2013.01)

(58) Field of Classification Search
CPC . B01D 53/66; B01J 19/24; B01J 2219/00164; B01J 2219/24; B64D 37/32
See application file for complete search history.

(56) References Cited

U.S. PATENT DOCUMENTS

| | | | |
|---|---|---|---|
| 2005/0115404 A1* | 6/2005 | Leigh | B01D 53/0454 95/11 |
| 2005/0173017 A1* | 8/2005 | Moravec | B64D 37/32 141/66 |
| 2005/0223895 A1 | 10/2005 | Wong | |
| 2005/0247197 A1* | 11/2005 | Snow, Jr. | A62C 3/06 95/138 |
| 2010/0310392 A1 | 12/2010 | Lippold et al. | |
| 2011/0062288 A1 | 3/2011 | Cremers et al. | |
| 2011/0131999 A1 | 6/2011 | Gao et al. | |
| 2013/0294950 A1* | 11/2013 | Massey | B64D 13/08 417/410.1 |
| 2015/0000523 A1 | 1/2015 | Jojic et al. | |

FOREIGN PATENT DOCUMENTS

WO    WO2013079466 A2    6/2013

OTHER PUBLICATIONS

Extended European Search Report for European Patent Application No. 16151814.7, dated Jun. 9, 2016, 8 pages.

* cited by examiner

*Primary Examiner* — Christopher P Jones
(74) *Attorney, Agent, or Firm* — Kinney & Lange, P.A.

(57) ABSTRACT

An air separation system includes a high temperature ozone converter, a mechanical separator, and an air separator downstream of the high temperature ozone converter and the mechanical separator. The air separator receives high temperature air and provides high temperature nitrogen-enriched air and high temperature oxygen-enriched air. The air separation system further includes a heat exchanger downstream of air separator that receives and cools the high temperature nitrogen-enriched air.

20 Claims, 2 Drawing Sheets

HIGH TEMPERATURE AIR SEPARATION SYSTEM ARCHITECTURE

BACKGROUND

The present disclosure relates to air separation systems for aircraft.

Air separation systems for aircraft typically separate air that has been cooled to about 200 degrees Fahrenheit (about 93 degrees Celsius). High temperature bleed air is fed into an air separation system at about 400 degrees Fahrenheit (about 204 degrees Celsius). The high temperature bleed air subsequently passes through a heat exchanger where the bleed air is cooled to about 200 degrees Fahrenheit (about 93 degrees Celsius), as performance of typical air separation modules declines at temperatures above 200 degrees Fahrenheit (about 93 degrees Celsius). The cooled bleed air can then pass through an ozone converter and a mechanical separator prior to entering one or more air separation modules. The air separation modules separate the cooled bleed air into nitrogen-enriched air and oxygen-enriched air. The oxygen-enriched air is typically vented overboard. The nitrogen-enriched air is used for inerting the fuel tanks of the aircraft.

SUMMARY

An air separation system includes a high temperature ozone converter, a mechanical separator, and an air separator downstream of the high temperature ozone converter and the mechanical separator. The air separator receives high temperature air and provides high temperature nitrogen-enriched air and high temperature oxygen-enriched air. The air separation system further includes a heat exchanger downstream of air separator that receives and cools the high temperature nitrogen-enriched air.

A method for separating high temperature air includes removing ozone contaminants from the high temperature air, removing oil particles from the high temperature air, and generating high temperature nitrogen-enriched air and high temperature oxygen-enriched air from the high temperature air in an air separator. The method further includes cooling the high temperature nitrogen-enriched air with a heat exchanger and delivering the high temperature nitrogen-enriched air to a fuel tank.

DETAILED DESCRIPTION

The air separation system of the present disclosure has a high temperature architecture, which allows the air separation system to operate more efficiently. The air separation system uses a high temperature ozone converter and high temperature air separation modules (ASMs), which eliminate the need for cooling high temperature bleed air prior to separation into nitrogen-enriched air (NEA) and oxygen-enriched air (OEA). Instead, the ASMs produce high temperature NEA, which is then cooled to an acceptable temperature for fuel tank inerting. Cooling only the high temperature NEA allows the heat exchanger to be smaller, which reduces the overall weight and size of the air separation system and conserves fuel. The high temperature architecture also reduces potential contamination of the ASMs, allows air separation to occur at an accelerated rate, and uses less bleed air, which allows for more efficient engine operation.

Figure 1:
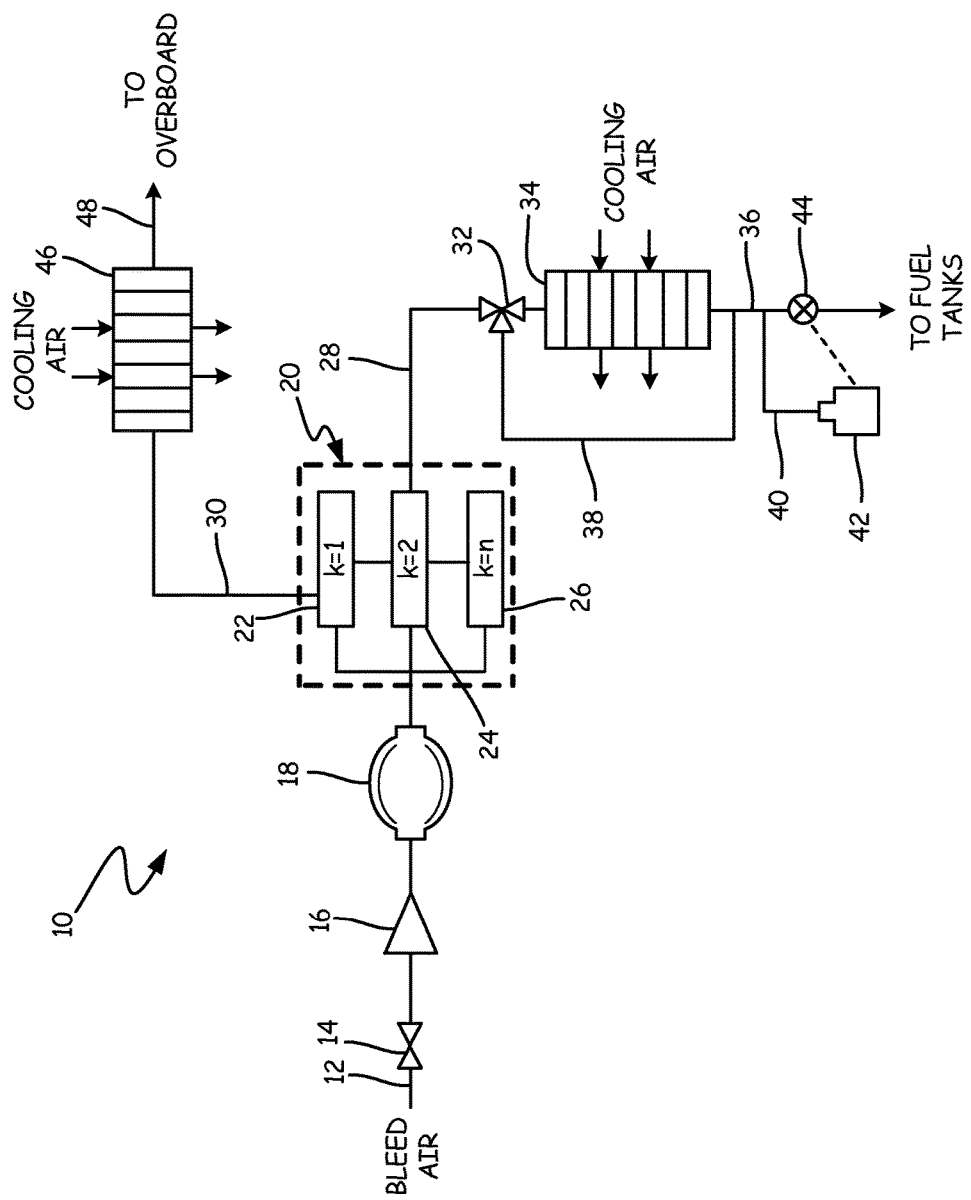
FIG. 1 is a schematic diagram of an air separation system.

FIG. 1 is a schematic diagram of air separation system 10. Air separation system 10 includes high temperature bleed air line 12, shut off valve 14, high temperature oxygen converter 16, mechanical separator 18, and air separation manifold 20 with ASMs 22, 24, and 26. Air separation system 10 also includes high temperature NEA line 28, high temperature OEA line 30, three-way valve 32, heat exchanger 34, cooled NEA line 36, bypass line 38, oxygen sensor line 40, oxygen sensor 42, flow control valve 44, heat exchanger 46, and cooled OEA line 48.

High temperature bleed air enters air separation system 10 through high temperature bleed air line 12. The high temperature bleed air then passes through shut off valve 14, high temperature oxygen converter 16, and mechanical separator 18. In the embodiment shown, the high temperature bleed air passes through high temperature oxygen converter 16 prior to passing through mechanical separator 18. In other embodiments, mechanical separator 18 can be located upstream of high temperature oxygen converter 16, and the high temperature bleed air can pass through mechanical separator 18 prior to passing through high temperature oxygen converter 16. After passing through high temperature oxygen converter 16 and mechanical separator 18, the high temperature bleed air enters air separation manifold 20, where ASMs 22, 24, and 26 separate the high temperature bleed air into high temperature NEA and high temperature OEA. The high temperature NEA is then cooled in heat exchanger 34 and distributed through cooled NEA line 36 to fuel tanks for inerting. The high temperature OEA can be vented overboard or cooled in heat exchanger 46 and then vented overboard through cooled OEA line 48.

The high temperature bleed air entering air separation system 10 is at a temperature between about 300 and 400 degrees Fahrenheit (between about 149 and 204 degrees Celsius). Shut off valve 14 can prevent the high temperature bleed air from traveling any further in air separation system 10, shutting off air separation system 10 entirely, if necessary. After high temperature bleed air passes through shut off valve 14, high temperature ozone converter 16 removes ozone contaminants from the high temperature bleed air. High temperature ozone converter 16 includes an ozone catalyst that is more efficient at higher temperatures and functions properly at temperatures between about 300 and 400 degrees Fahrenheit (between about 149 and 204 degrees Celsius). High temperature ozone converter 16 eliminates the need to cool the high temperature bleed air before ozone contaminants are removed. Mechanical separator 18 removes oil particles, reducing the risk of system failure due to ingestion of an oil slug. Mechanical separator 18 is a separator that functions at high temperatures, such as a swirl vane.

The high temperature bleed air does not experience any significant drop in temperature when passing through high temperature ozone converter 16 and mechanical separator 18, so the high temperature bleed air that enters air separation manifold 20 is at a temperature between 300 and 400 degrees Fahrenheit (between about 149 and 204 degrees Celsius). ASMs 22, 24, and 26 separate the high temperature air into high temperature NEA and high temperature OEA. Many ASMs, such as fiber membrane ASMs, cannot withstand high temperatures due to the temperature limitations of the components. ASMs 22, 24, and 26 are high temperature ASMS that can withstand high temperatures of up to about 400 degrees Fahrenheit (about 204 degrees Celsius), which is advantageous because air separation is more efficient at higher temperatures. Additionally, at higher temperatures those contaminants that are potentially harmful to ASMs 22, 24, and 26 are more likely to exist in the vapor phase. In the vapor phase, the contaminants are less harmful to ASMs 22, 24, and 26.

In the embodiment shown, air separation system 10 includes three ASMs 22, 24, and 26. In an alternative embodiment, air separation system 10 can include a single ASM. In an alternative embodiment, air separation system 10 can include air separation manifold 20 with between one and seven ASMs. The number of ASMs depends on desired applications. The size of the fuel tanks as well as the range of the aircraft are two factors to be considered. The greater the number of ASMs, the quicker fuel tank inerting will occur. Air separation manifold 20 connects ASMs 22, 24, and 26 such that a single stream of high temperature NEA and a single stream of high temperature OEA leave air separation manifold 20. The temperature of the high temperature NEA and the high temperature OEA leaving air separation manifold 20 is between 250 and 350 degrees Fahrenheit (between about 121 and 177 degrees Celsius). High temperature NEA leaves air separation manifold 20 through high temperature NEA line 28 and flows into heat exchanger 34 through three-way flow valve 32. High temperature OEA leaves air separation manifold 20 through high temperature OEA line 30.

In the embodiment shown, air separation system 10 includes three-way flow valve 32 and bypass line 38. In an alternative embodiment, air separation system does not include three-way flow valve 32 or bypass line 38. Three-way flow valve 32 controls the flow of high temperature NEA from high temperature NEA line 28 to flow into heat exchanger 34. Heat exchanger 34 cools the high temperature NEA, and cooled NEA exits heat exchanger 34 through cooled NEA line 36. Heat exchanger 34 can be an aluminum plate fin heat exchanger that uses cooling air, such as RAM air or recirculation air, to cool the high temperature NEA. Since heat exchanger 34 only needs to cool high temperature NEA and not high temperature bleed air, heat exchanger 34 can be smaller in size and weight, reducing the size and weight of air separation system 10.

Three-way flow valve 32 also controls the flow of high temperature NEA from high temperature NEA line 28 into bypass line 38. Bypass line 38 allows some of the high temperature NEA to bypass heat exchanger 34 and mix with the cooled NEA in cooled NEA line 36 to regulate the temperature of the cooled NEA in cooled NEA line 36. The temperature in cooled NEA line 36 is about 200 degrees Fahrenheit (about 93 degrees Celsius). The cooled NEA flowing through cooled NEA line 36 is subsequently distributed to fuel tanks for inerting.

A sample of cooled NEA from cooled NEA line 36 flows through oxygen sensor line 40 and into oxygen sensor 42. Oxygen sensor 42 tests the oxygen concentration in the cooled NEA. Flow control valve 44 creates back pressure to control the flow of high temperature bleed air through air separation manifold 20, which in turn affects the concentration of cooled NEA distributed to the fuel tanks. In one embodiment, the cooled NEA contains less than 11% oxygen. In another embodiment, the cooled NEA contains less than 8% oxygen.

If the oxygen concentration sensed by oxygen sensor 42 is higher than desired, flow control valve 44 reduces the flow of high temperature bleed air through air separation manifold 20. If the oxygen concentration sensed by oxygen sensor 42 is lower than desired, flow control valve 44 increases the flow of high temperature bleed air through air separation manifold 20. In the embodiment shown, oxygen sensor 42 and flow control valve 44 are located downstream of heat exchanger 34. This architecture is advantageous, as oxygen sensor 42 can also detect malfunctions in heat exchanger 34. A higher oxygen concentration reading than expected can indicate a leak or crack in heat exchanger 34. In an alternative embodiment, oxygen sensor 42 and flow control valve 44 are located upstream of heat exchanger 34 and downstream of air separation module 20.

In the embodiment shown, air separation system 10 also includes heat exchanger 46, which cools high temperature OEA from high temperature OEA line 30 and outputs cooled OEA through cooled OEA line 48. The cooled OEA is subsequently vented overboard. In an alternative embodiment, air separation system 10 does not include heat exchanger 46 and cooled NEA line 48. High temperature OEA can usually be vented overboard without needing to be cooled, so air separation system 10 can function properly without heat exchanger 46. Removing heat exchanger 46 is advantageous, as it saves weight and reduces the size of air separation system 10, which results in fuel savings for the aircraft.

Figure 2:
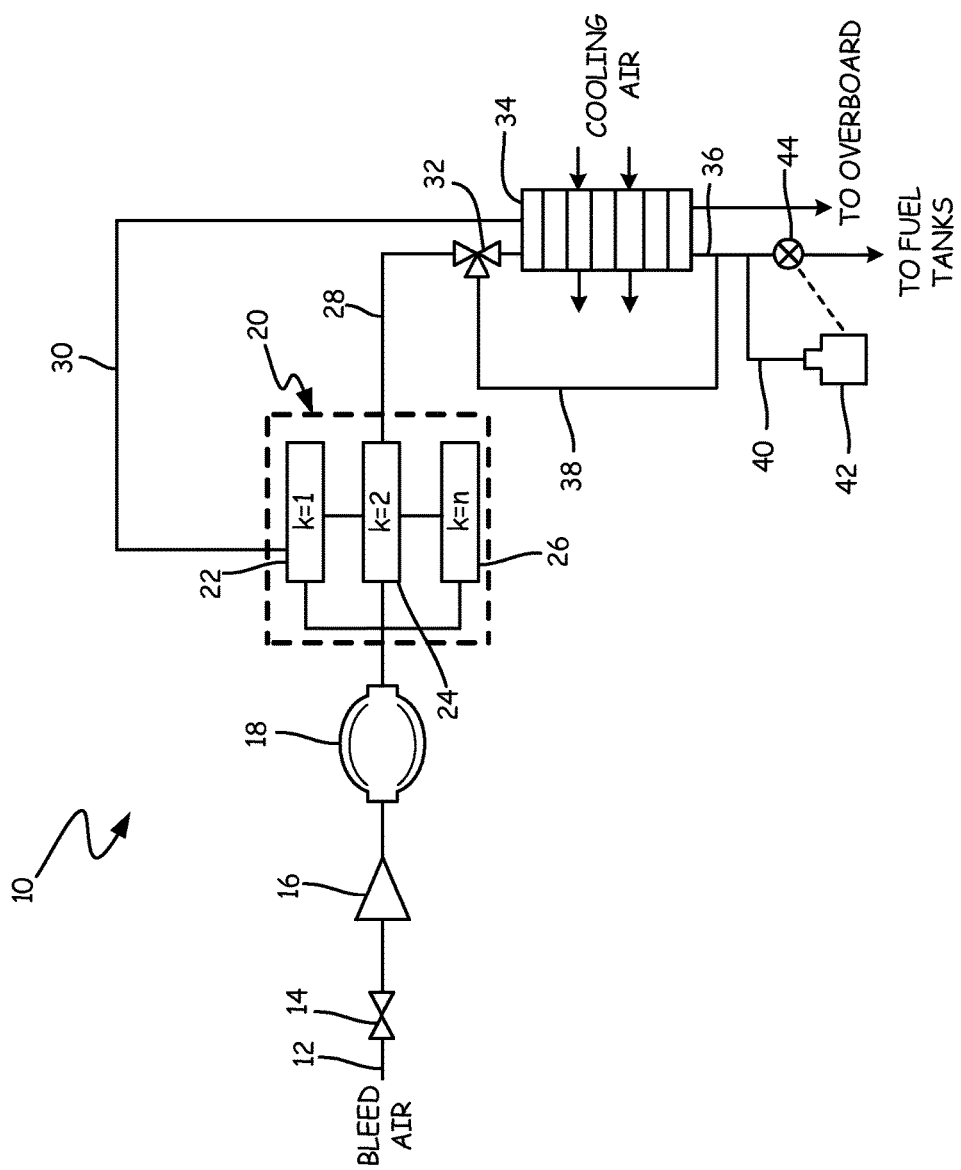
FIG. 2 is a schematic diagram of another embodiment of the air separation system of FIG. 1.

FIG. 2 is a schematic diagram of another embodiment of air separation system 10 shown in FIG. 1. Air separation system 10 includes high temperature bleed air line 12, shut off valve 14, high temperature oxygen converter 16, mechanical separator 18, and air separation manifold 20 with ASMs 22, 24, and 26. Air separation system 10 also includes high temperature NEA line 28, high temperature OEA line 30, three-way valve 32, heat exchanger 34, cooled NEA line 36, bypass line 38, oxygen sensor line 40, oxygen sensor 42, and flow control valve 44. The embodiment of air separation system 10 shown in FIG. 2 does not include heat exchanger 46 and cooled NEA line 48.

The embodiment of air separation system 10 shown in FIG. 1 functions in the same manner as the embodiment shown in FIG. 1 and described above, with the exception of cooling the high temperature OEA that leaves air separation manifold 20 through high temperature OEA line 30. In the embodiment shown, the high temperature OEA also flows through heat exchanger 34, where the high temperature OEA is cooled by the same cooling air flowing across heat exchanger 34 that cools the high temperature NEA. In this embodiment, heat exchanger 34 is a three-way heat exchanger with separate channels for the high temperature NEA and the high temperature OEA. This architecture is advantageous, because the use of a single heat exchanger eliminates the need for a separate heat exchanger to cool the high temperature OEA, which reduces the size and weight of air separation system 10.

Discussion of Possible Embodiments

The following are non-exclusive descriptions of possible embodiments of the present invention.

An air separation system according to an exemplary embodiment of this disclosure, among other possible things includes a high temperature ozone converter, a mechanical separator, and an air separator downstream of the high temperature ozone converter and the mechanical separator. The air separator receives high temperature air and provides high temperature nitrogen-enriched air and high temperature oxygen-enriched air. The air separation system further includes a heat exchanger downstream of the air separator that receives and cools the high temperature nitrogen-enriched air.

The air separation system of the preceding paragraph can optionally include, additionally and/or alternatively, any one or more of the following features, configurations and/or additional components:

A further embodiment of the foregoing air separation system, wherein the air separator includes a manifold of between one and seven air separation modules.

A further embodiment of any of the foregoing air separation systems, further including an oxygen sensor for sensing an oxygen concentration in the nitrogen-enriched air and a flow control valve for controlling a flow of the high temperature air through the air separator as a function of an output of the oxygen sensor.

A further embodiment of any of the foregoing air separation systems, wherein the flow control valve and the oxygen sensor are downstream of the air separator and upstream of the heat exchanger.

A further embodiment of any of the foregoing air separation systems, wherein the flow control valve and the oxygen sensor are downstream of the heat exchanger.

A further embodiment of any of the foregoing air separation systems, further including a heat exchanger bypass for flowing a portion of the high temperature nitrogen-enriched air around the first heat exchanger A further embodiment of any of the foregoing air separation systems, further including a second heat exchanger configured to receive and cool the high temperature oxygen-enriched air.

A further embodiment of any of the foregoing air separation systems, wherein the first heat exchanger is further configured to receive and cool the high temperature oxygen-enriched air.

A further embodiment of any of the foregoing air separation systems, wherein the first heat exchanger is a plate fin heat exchanger.

A method for separating high temperature air according to an exemplary embodiment of this disclosure, among other possible thing includes removing ozone contaminants from the high temperature air, removing oil particles from the high temperature air, and generating high temperature nitrogen-enriched air and high temperature oxygen-enriched air from the high temperature air in an air separator. The method further includes cooling the high temperature nitrogen-enriched air with a heat exchanger and delivering the high temperature nitrogen-enriched air to a fuel tank.

The method for separating air of the preceding paragraph can optionally include, additionally and/or alternatively, any one or more of the following features, configurations and/or additional components:

A further embodiment of the foregoing method, further including cooling the high temperature oxygen-enriched air with a second heat exchanger.

A further embodiment of any of the foregoing methods, further including cooling the high temperature oxygen-enriched air with the first heat exchanger.

A further embodiment of any of the foregoing methods, further including sensing an oxygen concentration in the nitrogen-enriched air and controlling a flow of the high temperature air through the air separator with a flow control valve as a function of the output of the oxygen concentration sensed.

A further embodiment of any of the foregoing methods, wherein the flow of the high temperature air through the air separator is controlled such that the generated high temperature nitrogen-enriched air comprises less than 11% oxygen.

A further embodiment of any of the foregoing methods, wherein the flow of the high temperature air through the air separator is controlled such that the generated high temperature nitrogen-enriched air comprises less than 8% oxygen.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air separation system comprising:
   a high temperature ozone converter;
   a mechanical separator;
   an air separator downstream of the high temperature ozone converter and the mechanical separator, the air separator configured to receive an amount of high temperature bleed air and provide high temperature nitrogen-enriched air and high temperature oxygen-enriched air;
   a high temperature bleed air flow path through which the amount of high temperature bleed air flows through the high temperature ozone converter and the mechanical separator to the air separator without flowing through a heat exchanger; and
   a first heat exchanger downstream of air separator and configured to receive and cool the high temperature nitrogen-enriched air;
   wherein the air separator is configured to receive only the amount of high temperature bleed air flowing through the high temperature bleed air flow path.

2. The air separation system of claim 1, wherein the air separator comprises a manifold of between one and seven air separation modules.

3. The air separation system of claim 1, and further comprising:
   an oxygen sensor for sensing an oxygen concentration in the nitrogen-enriched air; and
   a flow control valve for controlling a flow of the amount of high temperature air through the air separator as a function of an output of the oxygen sensor.

4. The air separation system of claim 3, wherein the flow control valve and the oxygen sensor are downstream of the air separator and upstream of the first heat exchanger.

5. The air separation system of claim 3, wherein the flow control valve and the oxygen sensor are downstream of the first heat exchanger.

6. The air separation system of claim 1, and further comprising a heat exchanger bypass for flowing a portion of the high temperature nitrogen-enriched air around the first heat exchanger.

7. The air separation system of claim 1, and further comprising a second heat exchanger configured to receive and cool the high temperature oxygen-enriched air.

8. The air separation system of claim 1, wherein the first heat exchanger is further configured to receive and cool the high temperature oxygen-enriched air.

9. The air separation system of claim 1, wherein the first heat exchanger is a plate fin heat exchanger.

10. A method for separating high temperature air, the method comprising:
   removing ozone contaminants from an amount of the high temperature air;
   removing oil particles from the amount of the high temperature air;
   delivering only the amount of the high temperature air at a temperature of between 300 and 400 degrees Fahrenheit into an air separator along a high temperature bleed air flow path without flowing the amount of the high temperature air through a heat exchanger prior to entering the air separator;
   generating high temperature nitrogen-enriched air and high temperature oxygen-enriched air from the amount of the high temperature air in an air separator;
   cooling the high temperature nitrogen-enriched air with a first heat exchanger; and
   delivering the cooled high temperature nitrogen-enriched air to a fuel tank.

11. The method of claim 10, and further comprising cooling the high temperature oxygen-enriched air with a second heat exchanger.

12. The method of claim 10, and further comprising cooling the high temperature oxygen-enriched air with the first heat exchanger.

13. The method of claim 10, and further comprising:
   sensing an oxygen concentration in the nitrogen-enriched air; and
   controlling a flow of the amount of the high temperature air through the air separator with a flow control valve as a function of the output of the oxygen concentration sensed.

14. The method of claim 13, wherein the flow of the amount of the high temperature air through the air separator is controlled such that the generated high temperature nitrogen-enriched air comprises less than 11% oxygen.

15. The method of claim 13, wherein the flow of the amount of the high temperature air through the air separator is controlled such that the generated high temperature nitrogen-enriched air comprises less than 8% oxygen.

16. An air separation system comprising:
   a high temperature bleed air line configured to deliver an amount of high temperature bleed air along a high temperature bleed air flow path at a temperature between 300 and 400 degrees Fahrenheit;
   an air separator configured to receive only the amount of high temperature bleed air from the high temperature bleed air line at a temperature between 300 and 400 degrees Fahrenheit and provide high temperature nitrogen-enriched air and high temperature oxygen-enriched air;
   a high temperature ozone converter and a mechanical separator connected in the flow path between the high temperature bleed air line and the air separator, wherein the flow path does not include a heat exchanger; and
   a first heat exchanger downstream of air separator and configured to receive and cool the high temperature nitrogen-enriched air.

17. The air separation system of claim 16, wherein the air separator comprises a manifold of between one and seven air separation modules.

18. The air separation system of claim 16, and further comprising:
   an oxygen sensor for sensing an oxygen concentration in the nitrogen-enriched air; and
   a flow control valve for controlling a flow of the high temperature air through the air separator as a function of an output of the oxygen sensor.

19. The air separation system of claim 18, wherein the flow control valve and the oxygen sensor are downstream of the air separator and upstream of the first heat exchanger.

20. The air separation system of claim 18, wherein the flow control valve and the oxygen sensor are downstream of the first heat exchanger.

* * * * *